Patented Nov. 26, 1935

2,022,485

UNITED STATES PATENT OFFICE 2,022,485

3,3-DIMETHYL-1-BROMO-BUTANE

Frank C. Whitmore and Walter R. Trent, State College, Pa., assignors to Mallinckrodt Chemical Works, St. Louis, Mo., a corporation of Missouri No Drawing. Application April 17, 1933, Serial No. 666,510

1 Claim. (Cl. 260—162)

This invention relates to alkyl halides, and with regard to certain more specific features, to the alkyl halide 3,3-dimethyl-1-bromo-butane.

Among the several objects of the invention may be noted the provision of the substance 3,3-dimethyl-1-bromo-butane in a high degree of purity, and the provision of processes of making the same which may be carried out upon commonly obtainable materials and with a minimum of complicated procedures; and the provision of the substance 3,3-dimethyl-1-bromo-butane in a form which readily reactive as an intermediate in the preparation of several pharmaceutical and other products. Other objects will be in part obvious and in part pointed out hereinafter.

The invention accordingly comprises the elements and combinations of elements, and features of composition, which will be exemplified in the products hereinafter described, and the scope of the application of which will be indicated in the following claim.

As set forth in several copending applications for Letters Patent of the same assignee, it has recently been determined that certain organic products including as a constituent thereof a carbon atom linked to four other carbon atoms, in a compound containing more than five carbon atoms, such as represented by the type formula:

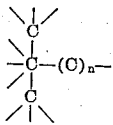

have valuable properties, particularly in the field of hypnotics, sedatives, soporifics, analgesics, bactericides, and the like. This arrangement, whereby one carbon atom is linked to four aliphatic carbon atoms, will hereinafter be referred to as the "neopentyl" arrangement.

One of the most valuable series of intermediates for the preparation of these neopentyl-including substances comprises the series of neopentyl halides, and, more specifically, the substance 3,3-dimethyl-1-bromo-butane which, for example, combine with barbituric acid and its derivatives to yield substituted barbituric acids which have greatly improved hypnotic and soporific powers. The same substance is readily combinable with substances such as malonic or other esters, and their derivatives, yielding products which are reducible to long-chain neopentyl acids, which are bactericidal, and which promise to be particularly efficacious in the treatment of leprosy.

The substance, 3,3-dimethyl-1-bromo-butane may be made in a high degree of purity in the following manner:

Starting with diisobutylene, this substance is converted into tertiary butyl acetic acid in the manner set forth in the copending application of the applicants Whitmore, Trent, and Homeyer, Serial No. 666,511, filed April 17, 1933 now Patent No. 2,004,066, granted June 4, 1935, which involves successive oxidation of the diisobutylene to methyl-2,2-dimethyl-propyl-ketone, and of the ketone thus prepared to tertiary butyl acetic acid. The details of this process will not be given here, reference to said application being made therefor. In the present process, the first step comprises esterifying the tertiary butyl acetic acid. This may take place, for example, by one of the following two methods: (a) The acid is mixed with dry ethyl alcohol, in the presence of hydrogen chloride, with the following reaction ensuing:

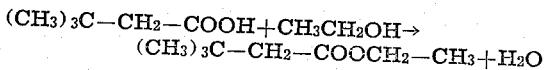

the product being the ethyl ester of tertiary butyl acetic acid. Or, (b) the acid may be converted to its corresponding acid chloride with thionyl chloride, or phosphorus trichloride, or the like, and the acid chloride then converted to the ester by treatment with (say) n-butyl alcohol, according to the reactions:

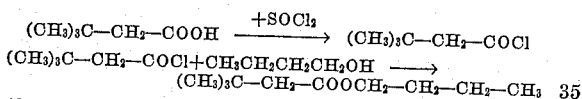

the product being the n-butyl ester of tertiary butyl acetic acid.

The ester, be it ethyl or n-butyl, or otherwise, is next reduced to the corresponding alcohol. This may be accomplished with sodium metal and absolute alcohol, according to the reaction:

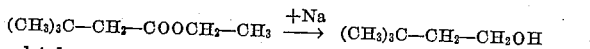

which yields as a product the compound, 3,3-dimethyl butanol-1. The reduction may also be accomplished by passing the vaporous ester together with hydrogen over a suitable catalyst such as the type described by Connor, Folkers, and Adkins in the Journal of the American Chemical Society, Volume 54, page 1138 (March 1932), comprising the decomposition products of copper ammonium chromate, with a barium addition.

The 3,3-dimethyl butanol-1 is now treated with phosphorus tribromide (or the analogous phosphorus compound if other halides be desired), and the desired product, 3,3-dimethyl, 1-bromo-butane, is obtained according to the reaction:

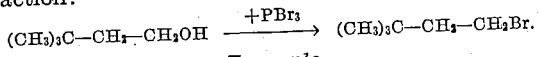

$(CH_3)_3C-CH_2-CH_2OH \xrightarrow{+PBr_3} (CH_3)_3C-CH_2-CH_2Br.$

*Example*

348 grams of tertiary butyl acetic acid, boiling from 94 to 96° C. at 26 mm. pressure were added to 230 grams of absolute ethyl alcohol which contained 25 grams of dry hydrogen chloride. The hydrogen chloride was generated by adding sulphuric acid to concentrated hydrochloric acid and passing the evolved gas through sulphuric acid to dry it, and thence into the absolute alcohol. The mixture of teriary butyl acetic acid and absolute alcohol was allowed to stand for three hours and was then heated, gently at first but later at a full reflux rate. The heating was continued for a total of three hours. The ester was washed with cold sodium hydroxide solution and then water, and was then dried with sodium sulphate and distilled. 310 grams of the ester (a 72% theoretical yield) was obtained. The density of the ester, at 20° C., with respect to water at 4° C., was about 0.8604, and its boiling point was about 125 to 126° C. at 730 mm. pressure.

The reduction was next carried out in a copper reaction container, for best yield, having three copper and one glass condensers, a stirrer, a heating coil, and a dropping funnel all entering the top. 70 grams of metallic sodium, headed in the usual manner in dry toluene, were placed in the container, the toluene totaling 250 cc. The stirrer was started, and in four minutes there were added (1) a mixture of 150 cc. absoluate alcohol, and 72 grams of the ethyl tertiary butyl acetate prepared in the manner set forth above, and immediately thereafter, (2) 500 cc. more of the absolute alcohol. After about ten minutes, the mixture was heated gently, and stirred for one-half hour. The mixture was then allowed to cool and was then removed from the container. The mixture was discolored and unevenly viscous. Water was added until the turbidity no longer increased, and the oil (3, 3-dimethyl butanol-1) was then extracted with ethyl ether, dried, and distilled. The product was a colorless oil which boiled at 141 to 143° C. under 737 mm. pressure, and had an index of refraction at 20° C. with respect to the sodium-D line, of about 1.4141. A yield of 26.4 grams (51% of the theoretical) was obtained.

20 grams of the 3,3-dimethyl butanol-1 prepared as above were next placed in a 200 cc. three-neck flask provided with a stirrer, a dropping funnel, and a thermometer. The flask was immersed in a freezing mixture and cooled to −10° C. 20 grams of phosphorus tribromide, boiling at 169 to 170° C. under 735 mm. pressure were then added gradually over a period of 1½ hours, the mixture being at all times well stirred and kept at a temperature of from −10 to −5° C. When all of the bromide had been added, the temperature dropped to −17° C. The mixture was then allowed to warm slowly to room temperature and to stand over night. The reaction flask was then attached to a fractionating column and was distilled under a pressure of 65 mm. The distillate boiling from 45 to 65° C. was collected. At the end of the distillation, the temperature of the heating bath was 120° C. The distillate was washed with sodium carbonate solution, separated, and dried. The dried distillate was then re-distilled under a pressure of 735 mm.

The product, 3,3-dimethyl-1-bromo-butane, was obtained in a total quantity of 11.7 grams (a yield of 36% of the theoretical). Its boiling point was determined as 134 to 137° C. at 735 mm. pressure, and its index of refraction (at 20° C. with respect to the sodium-D line) was determined as 1.4441 to 1.4447. It is a clear, colorless oily liquid, and has a pleasant odor, not suggestive of hydrogen bromide. There was no fuming or other evidence of decomposition during the distillation. The product showed no trace of a precipitate in a reasonable length of time when treated with alcoholic silver nitrate, showing that no free bromide was present.

From the above, it will be seen that the substance 3,3-dimethyl-1-bromo-butane has been obtained in an unusual state of purity.

In view of the above, it will be seen that the several objects of the invention are achieved and other advantageous results attained.

As many changes could be made in carrying out the above compositions and processes without departing from the scope of the invention, it is intended that all matter contained in the above description shall be interpreted as illustrative and not in a limiting sense.

We claim:

Pure 3,3-dimethyl-1-bromo-butane in the form of a colorless oily liquid and having substantially the following characteristics: Boiling point, 134 to 137° C. at 735 mm. Index of refraction, at 20° C., with respect to sodium-D line, 1,4441 to 1,4447.

FRANK C. WHITMORE.
WALTER R. TRENT.

Certificate of Correction

Patent No. 2,022,485. November 26, 1935.

FRANK C. WHITMORE ET AL.

It is hereby certified that errors appear in the printed specification of the above numbered patent requiring correction as follows: Page 1, first column, lines 29 to 34 inclusive, strike out the formula and insert instead the following:

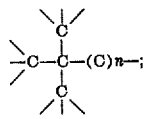

and second column, line 8, after "1933" insert a comma; page 2, second column, line 54, in the claim, for "1,4441 to 1,4447" read *1.4441 to 1.4447;* and that the said Letters Patent should be read with these corrections therein that the same may conform to the record of the case in the Patent Office.

Signed and sealed this 7th day of January, A. D. 1936.

[SEAL]

LESLIE FRAZER,
*Acting Commissioner of Patents.*